United States Patent [19]

McNelley

[11] Patent Number: 5,005,551
[45] Date of Patent: Apr. 9, 1991

[54] IN-LINE FUEL HEATER

[76] Inventor: Jerald R. McNelley, Rte. 2, Box 172, Benton, Tenn. 37307

[21] Appl. No.: 520,279

[22] Filed: May 7, 1990

Related U.S. Application Data

[63] Continuation-in-part of Ser. No. 306,641, Feb. 3, 1989, Pat. No. 4,926,830.

[51] Int. Cl.$^5$ ............................................. F02M 31/00
[52] U.S. Cl. .................................... 123/557; 123/546; 123/514
[58] Field of Search ............... 123/557, 543, 545, 546, 123/547, 514

[56] References Cited

U.S. PATENT DOCUMENTS

| | | | |
|---|---|---|---|
| 4,397,288 | 8/1983 | Kelling | 123/557 |
| 4,432,329 | 2/1984 | Redele | 123/557 |
| 4,684,786 | 8/1987 | Mann et al. | 123/557 |
| 4,748,960 | 6/1988 | Wolf | 123/557 |
| 4,807,584 | 2/1989 | Davis | 123/557 |
| 4,865,005 | 9/1989 | Griffith | 123/557 |
| 4,926,830 | 5/1990 | McNelley | 123/557 |

Primary Examiner—Andrew M. Dolinar
Assistant Examiner—M. Macy
Attorney, Agent, or Firm—Pitts and Brittian

[57] ABSTRACT

A system (110) for preheating fuel both in a fuel tank (16) and in a fuel supply line for an internal combustion engine. The system (110) includes a pair of heat exchangers (12 and 112) for transferrinhg heat from a heated fluid to the fuel. The tank heat exchanger (12) includes a fuel tube (32) with a right angle outlet (54), the fuel tube (32) being surrounded by the heated fluid for heating of the fuel prior to its entering the fuel line of the vehicle or other device in which the system is installed. In the preferred embodiment, the tank heat exchanger (12) is installed through an access opening (14) normally provided in fuel tanks used in diesel engine-powered over-the-road trucks. A flange (18) is provided for securing the tank heat exchanger (12) to the flange (20) which surrounds the opening (14) in the fuel tank (16).

The in-line heat exchanger (112) is installed in series with the fuel supply line between the engine and fuel tank (16), and is similar to the in-tank heat exchanger (12) in that it immerses a conveyance of heated fluid (153) in a volume of fuel (146) to be heated. The in-line heat exchanger (112) also utilizes the heat from and also further heats the unused fuel (151) returned from the engine.

8 Claims, 10 Drawing Sheets

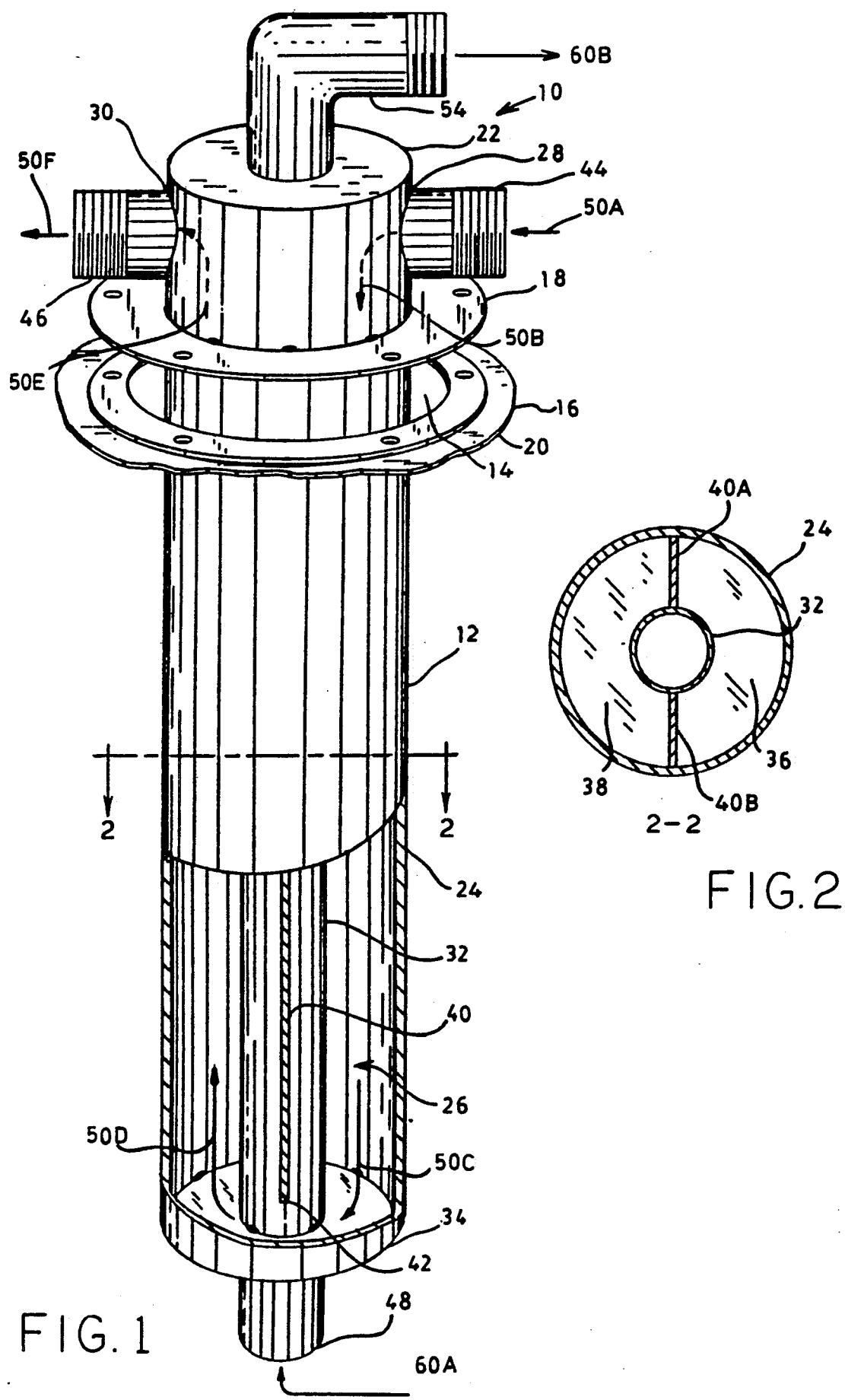

IN-LINE FUEL HEATER

This is a Continuation-In-Part application based upon application Ser. No. 7/306,641, filed Feb. 3, 1989, and assigned U.S. Pat. No. 4,926,830 which issued May 22, 1990.

TECHNICAL FIELD

This invention relates to a system for preheating fuel for an internal combustion engine, both in the fuel tank normally provided with a vehicle or other machine powered by such engine, and in the fuel supply line between the fuel tank and the engine.

BACKGROUND ART

It is well known that preheating the fuel used in an internal combustion engine improves the efficiency of the engine. Further, preheating the fuel typically used in a diesel engine can avoid serious fuel flow problems well known to occur in cold weather environments.

Diesel fuel, and in particular the No. 2 fuel oil typically burned by the engines of today's over-the-road trucks, can congeal or "wax" in the cold weather regularly experienced during the winter months in the northern states of the United States and in Canada. The jelling or "waxing" of fuel can shut a diesel engine down, necessitating the towing of the vehicle to a repair facility where the fuel tank must be heated to alleviate the problem. The expense of towing and downtime can be substantial.

A number of methods and devices have been developed in an attempt to solve the problem of the congealing of fuel oil in cold weather. One method has been to install a heater in the fuel line. U.S. Pat. No. 3,929,187 discloses a device which utilizes this method. However, this method does not solve the problem of the fuel oil's congealing within the fuel tank before it even gets into the fuel line.

Another method is to install a heater in the fuel tank. U.S. Pat. No. 4,237,850 discloses a device which utilizes this second method. The device disclosed in this patent has two primary disadvantages. One, while the fuel can be heated in the tank to a temperature above that at which it "waxes", it is not necessarily heated to a temperature which will prevent it from congealing in the fuel line in extremely cold weather, because of the volume of fuel which must be heated in the tank which is usually directly exposed to the cold outside air temperatures. Two, the device disclosed in this patent requires an access opening which must be cut/formed into the top of the fuel tank prior to installation of the device.

Therefore, it is a principal object of the present invention to provide a system for preheating diesel fuel, both in the fuel tank and in the fuel supply line between the tank and the engine, to a temperature above that at which the fuel would normally congeal.

It is a further object of the present invention to provide a system for preheating the diesel fuel leaving both the fuel tank and the in-line heater to a temperature which is sufficiently higher than the temperature at which the fuel would normally congeal such that the fuel cannot jell at any point in the fuel line between the fuel tank and the diesel engine to which it is supplied.

It is yet another object of the present invention to provide a system for preheating the fuel in the fuel tank of a diesel engine-powered vehicle or machine which includes a heat exchanger which can be installed through and secured in the opening normally provided in such a fuel tank for the installation of a fuel level gauge.

It is a still further object of the present invention to provide a diesel fuel supply line heater to be mounted in series with the fuel supply line between the engine and the tank to provide in-line as well as in-tank fuel heating.

It is yet a further object of the present invention to provide an in-line heater which can use fuel returned from the engine as the heated liquid in the tank heater and eliminate the possibility of contaminating the fuel in the tank by a foreign liquid should leakage occur.

It is another object of the present invention to utilize the heat inherent in the unused fuel being returned from the engine to aid in heating the fuel in the in-line heater.

It is another object of the present invention to heat still further the unused fuel being returned from the engine so that it can be used to aid in heating the fuel in the remainder of the system.

It is yet another object of the present invention to provide such an in-line heater having a water drain petcock so as to drain out any water introduced into the fuel by condensation, thus eliminating another possible source of fuel line freezing, as well as contamination.

Finally, it is yet one more object of the present invention to provide such an in-line heater having a capped filler spout input means for introducing a quantity of diesel fuel for beginning the process (priming) at initial installation and at other times as may be desired.

DISCLOSURE OF THE INVENTION

Other objects and advantages will be accomplished by the present invention which provides a system for preheating fuel for an internal combustion engine, both in the fuel tank normally provide with the vehicle or other device powered by such engine, and in the fuel supply line as well. The system includes two heat exchangers, one of which is installed in the fuel tank of the vehicle or other device, with the other being installed in series with the fuel supply line of such vehicle or device.

In the preferred embodiment, the heat exchanger of the tank unit is installed through and secured to the opening normally provided in the fuel tanks of most diesel engine-powered over-the-road trucks for installation of a fuel gauge. Most such trucks are provided with two fuel tanks and the fuel gauge access opening is usually only used for a fuel gauge in one of the tanks. Therefore, the unused opening in one of the tanks can be used for installation of this portion of the present invention. For simplification, the following discussion will relate first to the attributes of the tank heater, after which the in-line heat exchanger will be described. Throughout this document, it will be understood that the terms "heater" and "heat exchanger" are used interchangeably and synonymously to refer to the same device.

In the preferred embodiment, the tank heat exchanger is an elongated, substantially cylindrically shaped device made of a thermally conductive material, preferably a corrosion-resistant metal. This heat exchanger includes a heated fluid chamber and a fuel tube, which ends in a ninety degree elbow, extending through such chamber. The heated fluid chamber includes an inlet port and an outlet port positioned in a first end portion of the heat exchanger. A divider plate, which extends from the first end portion of the chamber through all but a small portion of the length of the chamber, is provided in the heated fluid chamber between the inlet and outlet port. The divider plate divides the heated fluid chamber into an inlet section and an outlet section, whereby heated fluid from an external source enters through the inlet port and travels through the inlet section toward the second end portion of the chamber, where it passes into the outlet section and travels back toward the first end portion, before exiting through the outlet port and returning to the external source for reheating. Heat is transferred throught the external walls of the heat exchanger from the heated fluid to the fuel in the fuel tank.

As indicated above, a fuel tube with a ninety degree elbow termination is provided which extends through, and is therefore surrounded by, the heated fluid chamber. In the preferred embodiment, fuel is drawn into an open fuel inlet end of the tube proximate and external to the second end portion of the heat exchanger. In the fuel tube, the fuel is heated by the heated fluid in the above-described chamber surrounding the fuel tube. After passing through the fuel tube, the fuel exits from the fuel outlet ninety degree elbow end of the tube, connected to the fuel line of the vehicle in which the present invention is installed, proximate and external to the first end portion of the heat exchanger, to be conducted to the engine.

In the preferred embodiment, the external source of heated fluid is the radiator of the vehicle in which the present invention is installed. Fluid communication can be provided between the radiator and the inlet and outlet ports of the above-described heated fluid chamber via flexible hoses similar to those normally used in internal combustion engines to provide fluid communication between the radiator and the engine block. In another embodiment of the present invention, the heated fluid can comprise lubricating oil circulated from the oil pan of the engine with which the system is used.

In this case, fuel is drawn from the fuel tank through the ninety degree elbow end of the fuel tube of the present invention into the fuel line as described above by the fuel pump of the engine of the vehicle or other device in which the system is installed. Hot engine oil from the engine oil pan fills the heated fluid space surrounding the fuel tube, heating the fuel therein, just as described above for engine coolant from the radiator.

In yet another embodiment, the fuel tube, which has fluid communication with the fuel in the tank, has been modified so that there is no fluid communication with the fuel in the tank. Instead, the central tube has fluid communication with the outer heated fluid space described above. Heated fluid is introduced through the ninety degree elbow and passes down through the central tube, exiting at the distal end into the outer heated fluid space. As the heated fluid rises through the heated fluid space to exit through the port proximate the first end of the heat exchanger, it transfers its heat through the walls defining the heated fluid space to the surrounding fuel. This alternate method has the advantage of being implementable without disturbing existing fuel line connections.

The in-line heater portion of the present invention embodies a container having a plurality of input and output connections and defining a volume therein. This in-line heater can be of various shapes and sizes to fit the environmental constraints of the vehicle in which it is to be installed. It is preferably make of a corrsion resistant, high strength metal, although it need not be thermally conductive.

A first input connection is made to an end of a fuel supply hose or line which has been diverted from its original path for the purpose of this connection, allowing fuel to be pumped into the container portion. A first output connection is made to the existing end of the fuel line, allowing the fuel to continue out of the container to the engine. A second input connection to the container portion of the in-line heater is made to the line from the engine bringing returned fuel which would normally go to the vehicle's fuel tank. Instead, this returned fuel now flows through a pipe which passes through the container portion of the in-line heater to a second output connection. The hose from this second output connection carries the warmed return fuel to the heated liquid input port of the tank heater where it aids in heating the fuel in the tank before it is added to the fuel in the tank, adding still further to the heating process.

A third input connection of the container portion of the in-line heater receives a heated fluid from the vehicle's engine. This heated fluid flows through a pipe which also passes completely through the container of the in-line heater to a third output connection, returning the heated liquid to its source.

As the pipes of both the return fuel and the heated liquid pass through the container portion of the in-line heater, they are immersed in the fuel filling the volume of the container. The heat contained in both the return fuel and the heated liquid thus work together to heat the fuel going to the engine through the fuel supply line. Further, whatever heat is in the return fuel line is retained enhanced by the heated fluid to be added to the heating of the fuel in the tank.

Alternatively, the heated liquid output from the in-line heater can also be routed through the tank heater, with the return fuel going directly to the vehicle's fuel tank, still heating the fuel in the tank and in the line simultaneously.

BRIEF DESCRIPTION OF THE DRAWINGS

FIG. 1 illustrates a perspective view, partially cut away, of a device, constructed in accordance with various features of the present invention, for preheating fuel in a fuel tank for an internal combustion engine.

FIG. 2 illustrates a top view in section of the heat exchanger, taken at 2—2 of FIG. 1, of a device, constructed in accordance with various features of the present invention, for preheating fuel for an internal combustion engine.

BEST MODE FOR CARRYING OUT THE INVENTION

Figure 3:
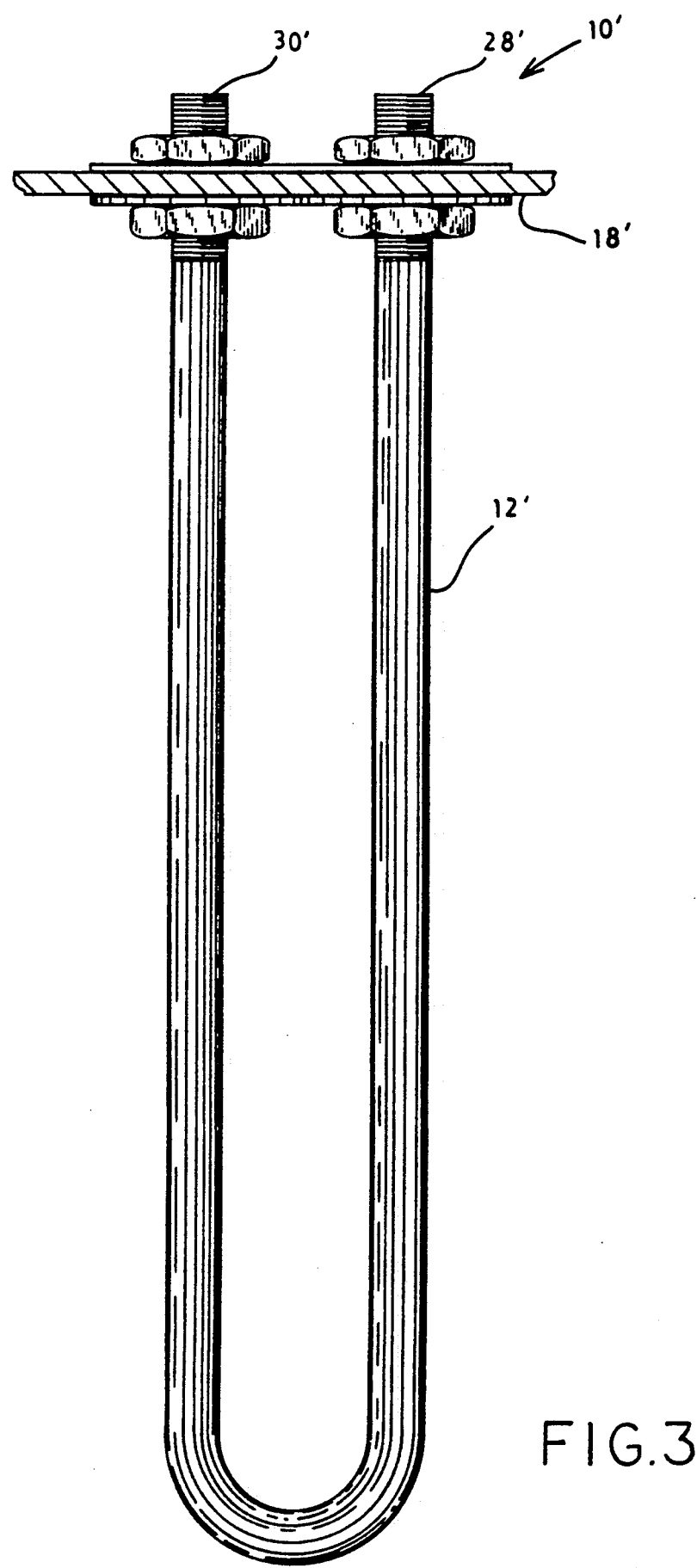
FIG. 3 illustrates a front elevation view of an alternate embodiment of a device, constructed in accordance with various features of the present invention, for preheating fuel in a fuel tank for an internal combustion engine.

A system for preheating fuel for an internal combustion engine in the fuel tank normally provided with the vehicle or other device powered by such engine is illustrated generally at 10 in FIG. 1. The system includes a heat exchanger shown generally at 12. The heat exchanger 12 is installed through an access opening 14 which is normally provided in fuel tanks for diesel engine-powered over-the-road trucks for installation of a fuel gauge. A portion of such a fuel tank is illustrated at 16. A fuel gauge installed in tank 16B is illustrated at 120 in FIGS. 7, 8, and 9. In FIG. 1, the heat exchanger 12 is provided with a flange 18, which is dimensioned and predrilled to match the flange 20 surrounding the opening 14 in the fuel tank 16, proximate a first end portion 22 of the heat exchanger 12. When the system 10 is installed, an appropriate gasket or seal (not shown) is installed between the flange 18 and the flange 20.

The heat exchanger 12 comprises a substantially cylindrical vessel having an outer wall 24 which defines an interior heated fluid chamber 26. An inlet port 28 and an outlet port 30 are provided proximate the first end portion 22 of the heat exchanger 12, between the first end portion 22 and the flange 18, through which a heated fluid is supplied from and returned to an external source of the heated fluid. A fuel tube 32 extends axially through the heat exchanger 12 from externally of its second end portion 34 to externally of its first end portion 22. The fuel tube 32 is surrounded by the heated fluid chamber 26 as shown in FIGS. 1 and 2. The heated fluid chamber 26 is divided into an inlet section 36 and an outlet section 38, as illustrated in FIG. 2, by a divider plate 40, comprised of two coplanar plate sections 40A and 40B positioned between the fuel tube 32 and the outer wall 24 of the heat exchanger 12. The divider plate 40 extends from the first end portion 22 of the heat exchanger 12, parallel to the fuel tube 32, for all but a small portion of the length of the heat exchanger 12 where it terminates in a distal end portion 42, such that fluid communication is provided between the inlet section 36 and the outlet section 38 of the heated fluid chamber 26 proximate the second end portion 34 of the heat exchanger.

Figure 4:
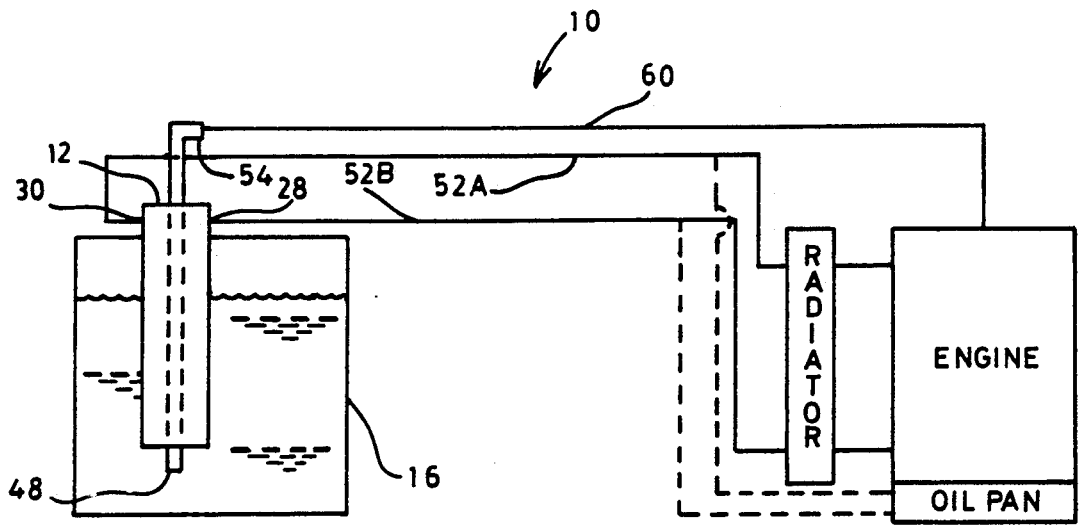
FIG. 4 illustrates a block diagram of a system, constucted in accordance with various features of the present invention, for preheating fuel in a fuel tank for an internal combustion engine.

Referring to FIGS. 1 and 4, it can be seen that heated fluid enters the tank heater via an appropriate fitting 44 portion of the inlet port 28 of the heat exchanger 12, as indicated by the arrows 50A and 50B. The heated fluid travels down through the inlet section 36 of the heated fluid chamber 26 and under the distal end portion 42 of the divider plate 40 into the outlet section 38 of the heated fluid chamber 26, as indicated by the arrows 50B, 50C, and 50D. The heated fluid exits the outlet section 38 of the chamber 26 through the outlet port 30 via an appropriate fitting 46, as indicated by the arrows 50E and 50F. It will be appreciated by those skilled in the art that heat from the heated fluid will be transferred to the fuel in the fuel tank which surrounds the heat exchanger 12, which preferably is constructed of a corrosion resistant metal which has good thermal conductivity. In the preferred embodiment, the heated fluid comprises heated coolant supplied from and returned to the radiator of the vehicle or other device in which the system 10 is installed as illustrated by the block diagram of FIG. 4. It will be appreciated by those skilled in the art that fluid communication can be provided between the radiator and the inlet and outlet port fittings, 44 and 46 respectively, by hoses, indicated by the reference numerals 52A and 52B in FIG. 4, similar to those typically used between a radiator and the block of an internal combustion engine. Also, as indicated with dashed lines in FIG. 4, the hoses 52A and 52B could be alternatively connected to the oil pan of the internal combustion engine for the circulation of lubricating oil as the heated fluid for the heating of the fuel.

Still referring to FIGS. 1 and 4, it can be seen that fuel from the tank enters the fuel tube 32 through the open fuel inlet end 48 of the tube 32, as indicated by the arrow 60A, and exits through the fuel outlet ninety degree elbow end 54 of the tube 32, proximate and externally of the first end portion 22 of the heat exchanger 12, as indicated by the arrow 60B. The right angle outlet end 54 of the fuel tube 32 communicates with the fuel line, indicated by the line 60 in the block diagram illustrated in FIG. 4, which supplies fuel to the engine. It will be appreciated by those skilled in the art that the fuel entering the fuel line will have been heated in the fuel tube 32 by the heated fluid in the chamber 26 which surrounds the tube 32.

Referring to FIG. 3, an alternate embodiment 20' of the system of the present invention is illustrated. In the system 10', the heat exchanger 12' comprises a U-shaped tube secured proximate its inlet an outlet openings, 28' and 30', respectively, to a flange 18' which may be secured to a fuel tank in a manner similar to that described for the system 10 illustrated in FIGS. 1, 2, and 4.

Figure 5:
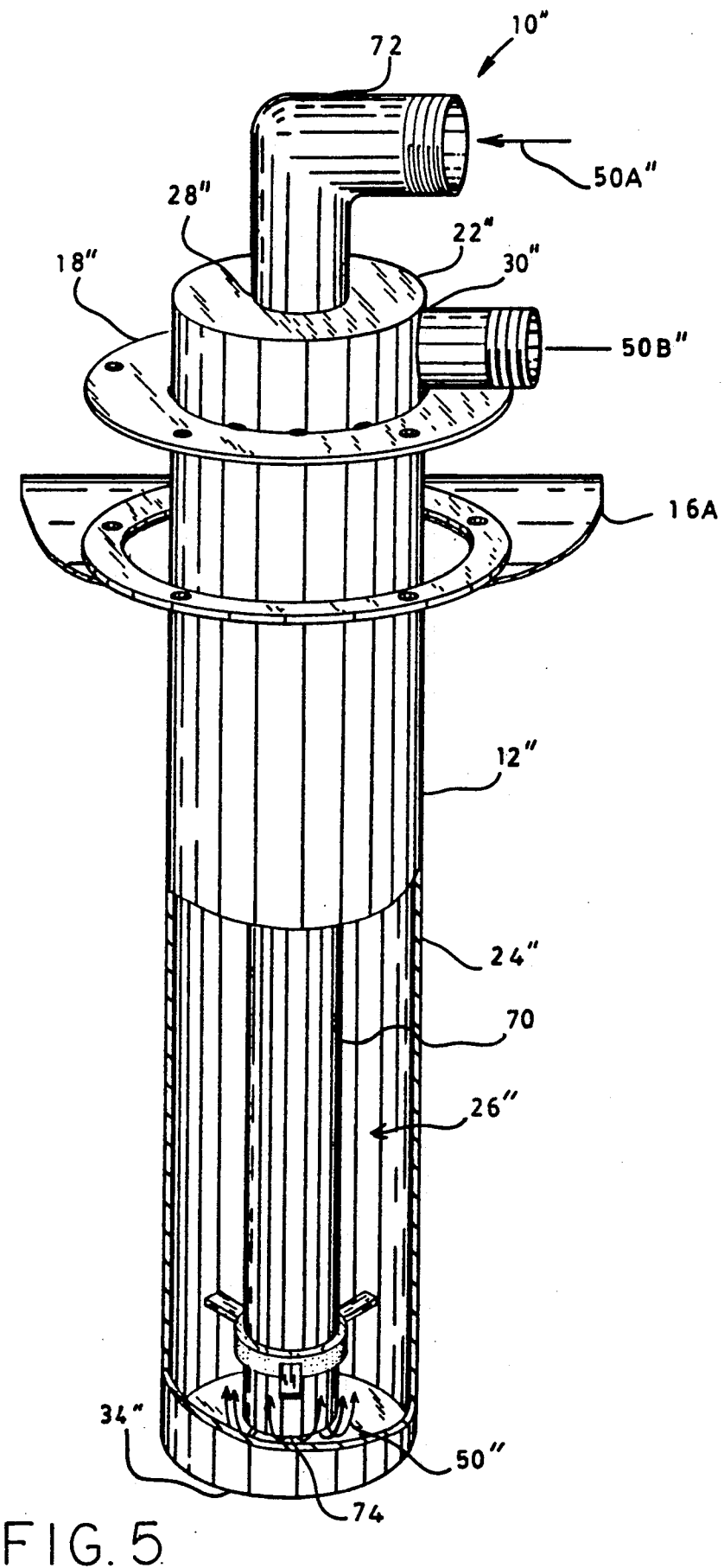
FIG. 5 illustates a perspective view, partially cut away, of another embodiment of a device, constructed in accordance with various features of the present invention, for preheating fuel in a tank for an internal conbustion engine.

At 10" of FIG. 5, another alternate embodiment of the system of the present invention is illustrated. In the system 10", the heat exchanger 12" comprises an elongated substantially cylindrical vessel having a similar overall external appearance to the heat exchanger 12 of the system 10 illustrated in FIG. 1. However, in this embodiment, there is no fuel tube extending through the heat exchanger 12" as in the system 10; in this system 10", fuel line connections in the vehicle or other device in which the system is used are left undisturbed. The heat exchanger 12" defines a heated fluid chamber 26" and includes a heated fluid inlet port 28" positioned coaxially with the longitudinal axis of the heat exchanger 12" in the first end portion 22" of the heat exchanger. A heated fluid inlet tube 70 is provided which extends coaxially through the heat exchanger 12" from a ninety degree elbow inlet end 72, positioned externally of and proximate the first end portion 22" of the heat exchanger 12", through the inlet port 28", to an open outlet end 74 positioned within the heated fluid chamber 26" proximate the second end portion 34" of the heat exchanger, such that heated fluid in the inlet tube 70 flows into the heated fluid chamber 26", as indicated by the arrows 50". In this embodiment, heated fluid from an external source (as described above for the system 10) enters the right angle inlet end 72 of the inlet port 28" and fuel tube 70, flows down through the tube 70 and out of the outlet end 74 into the chamber 26" proximate the second end portion 34" of the heat exchanger 12", and back toward the first end portion 22", and back toward the first end portion 22" of the heat exchanger where it exits through the outlet port 30", as indicated by the arrows 50A", 50", and 50B". The heat exchanger 12" includes a flange 18" which may be secured to a fuel tank 16A in a manner similar to that described for the system 10 illustrated in that described for the system 10 illustrated in FIG. 1. It will be appreciated by those skilled in the art that, because of the flow path of the heated fluid, the greatest heat transfer from the heated fluid to the fuel in the fuel tank will occur near the second end portion 34" of the heat exchanger 12". Since the heat exchanger is installed through an opening normally provided in the top portion of the fuel tank, the second end portion 34" of the heat exchanger will be positioned near the bottom of the fuel tank from which fuel is drawn into the fuel line. Therefore, heating of the fuel entering the fuel line is enhanced. This embodiment of the present invention also has the advantage of having improved heat transfer characteristics over prior art systems which utilize a U-shaped tube heat exchanger similar to that shown in the system 10' illustrated in FIG. 3. Heat transfer from the heated fluid to the fuel in the fuel tank is increased because of the relatively large surface area provided by the external walls 24" of the heat exchanger 12" as compared to the U-shaped tube devices.

The right angle or ninety degree elbow feature 54 of fuel tube 32, or 72 of heated fluid tube 70, of the above-described heat exchanger embodiments 12 or 12", instead of ending in a straight fitting that extends at a right angle to the heated fluid inlet ports 28 or 30", provides a fuel hose connection point which is parallel with that of the heated fluid hoses and inlet ports 28 and 30". This elbow joint provision allows connecting hoses to be more conveniently attached and consume less space within the confines of the host vehicle. By providing the invention with fuel tube 32 already formed into an elbow joint, the necessity for later attachment of a ninety degree adapter, with attendant possibilities for leakage, is eliminated.

In light of the foregoing, it can be seen that a system 10 is provided by the present invention for preheating the fuel for an internal combustion engine in the fuel tank 16 by a heat exchanger 12 installed through an access opening 14 in the fuel tank. Heat from a heated fluid which is supplied to the heat exchanger 12, as indicated by the arrows 50, is transferred to the fuel in the fuel tank 16. The fuel is further heated by the heated fluid as it is drawn through the fuel tube 32 into the fuel line 60.

In the alternate embodiment which is the subject of this CIP application, another heating unit has been added to the tank heater previously described. This new unit is called an in-line heater because it is added in series with the fuel supply line of a vehicle in which it is installed. In this fashion, fuel can pass through both the tank and in-line heaters for heating enroute to the engine. An in-line heater portion constructed in accordance with various features of the present invention is illustrated generally at 110 and more specifically at 112 in FIGS. 4A, 4B, 6, 7, 8, 9, and 10.

Figure 6:
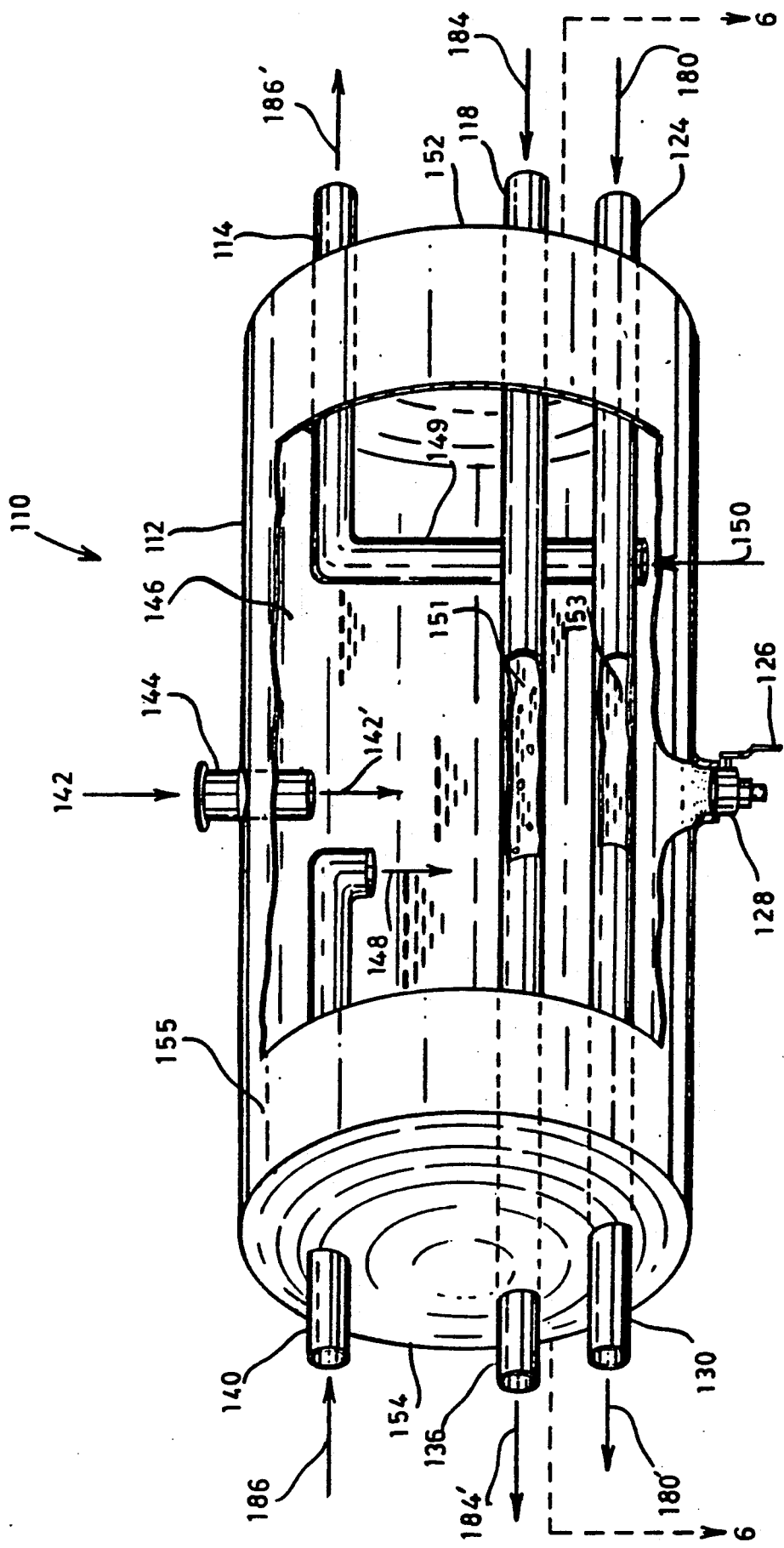
FIG. 6 illustrates a perspective view, partially cut away, of an in-line heat exchanging device consturcted in accordance with various features of the present invention.

Referring to FIG. 6, an in-line heater 112 is illustrated, comprised of a container, having a side wall portion 155 and end wall portions 152, 154, which, together, define a volume for containing fuel. In-line heater 112 can be constructed in any shape and size suitable for the environment constraints of the vehicle in which it is to be installed. It is preferably made of a high strength, corrosion resistant metal, and need not be thermally conductive.

In a preferred embodiment, in-line heater 112 is a cylindrical or semi-cylindrical body having a single, continuous side body 155, the two ends of which are joined by a process such as welding, for instance, and having end walls 152 and 154 attached by the same or a similar process. As illustrated, each of the walls 152 and 154 contains a plurality of inlet an outlet ports passing therethrough and attached thereto in such a manner as to render the volume defined by the walls of in-line heater 112 substantially airtight. An upwardly disposed portion of heater 112 is further provided with a capped priming port or spout 144 for initial filling of the volume defined by heater 112 with fuel. This priming fuel flows in the direction indicated by arrows 142 and 142' to fill the volume of 112 with fuel as indicated by 146. A drain orifice 128 is provided at a bottom point of heater 112 for draining the heavier condensate water from the fuel 146 by judiciously operating ball valve handle 126 provided for that purpose.

A first inlet port 140 is provided for conducting fuel from a fuel line into the volume defined by heater 112. As illustrated in the cutaway portion of FIG. 6, this port 140 terminates proximate the upper limit of container 112. Fuel conducted into this port 140 in the direction of arrow 186 would enter the container in the direction of arrow 148 to replenish the fuel 146 drawn out at port 114.

A discontiguous exit port 114 draws fuel 146 from proximate the bottom of container 112, through stand-pipe 149, as shown by arrow 150. Of course, it will be seen by those with expertise in the field that the termination of stand-pipe 149 will be spaced above the bottom of tank 112 a sufficient amount to preclude the intake therethrough of water or sediment which accumulate thereat. Fuel 146, thus drawn up through 149, exits heater 112 through port 114 in the direction of arrow 186' to go to the engine. It will be seen by those skilled in the art that the input end of pipe 149 is preferably located proximate the bottom of heater 112 for two reasons. First, to be able to draw substantially all of the usable fuel 146 out of the volume of 112, and second, because the portion of fuel 146 nearest the bottom of 112 is also nearest the pipe conducting the heated fluid 153 and is thus the hotter portion.

Figure 7:
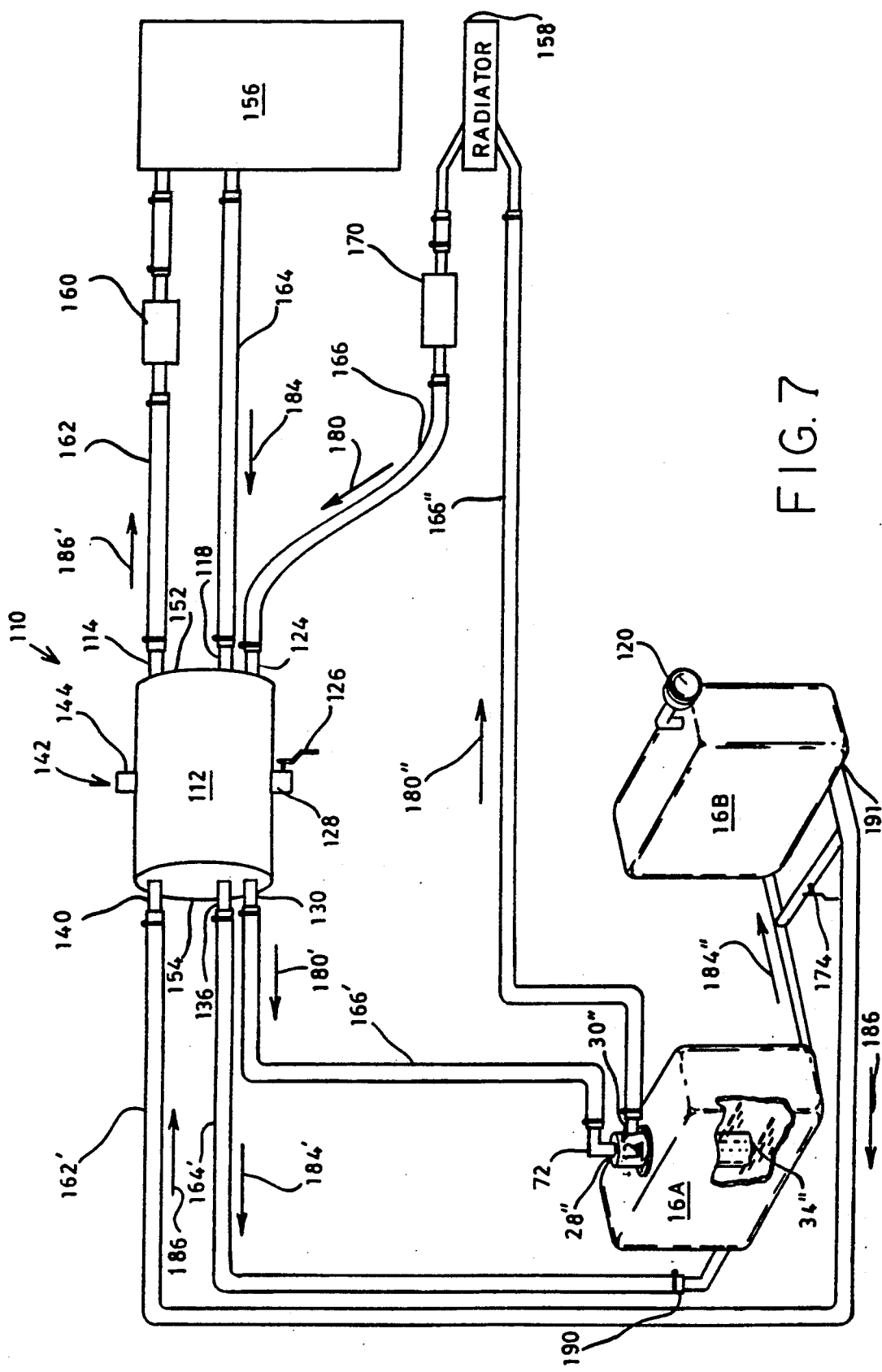
FIG. 7 is a pictorial illustration of a system diagram of one arrangement of the present invention, wherein engine coolant from a vehicle's radiator is the heated fluid used in both the tank heater and the in-line heater.
Figure 8:
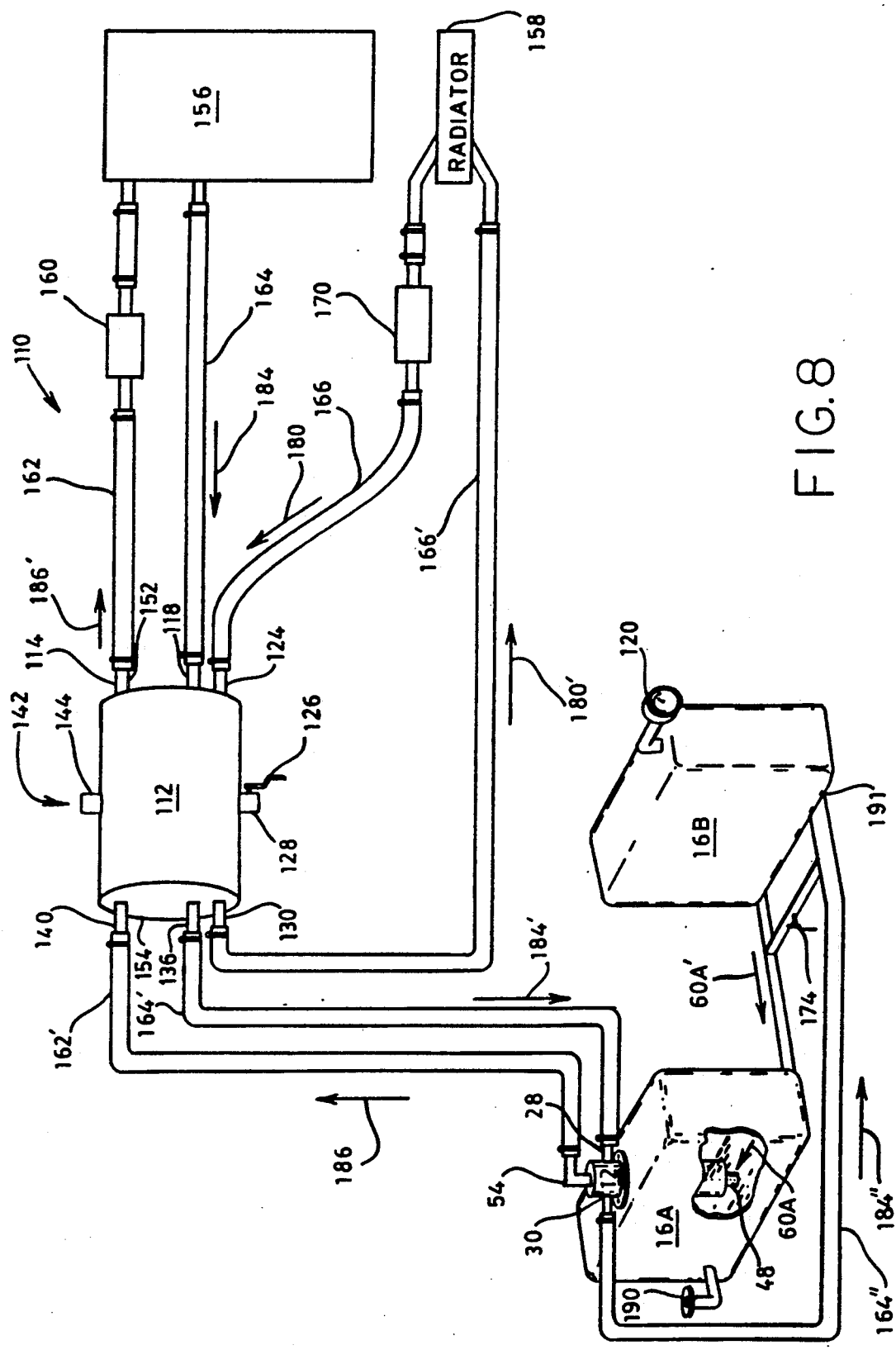
FIG. 8 is a pictorial illustration of a system diagram of one arrangement of the present invention, wherein unused, returning fuel from the engine is the heated fluid used in the tank heater, and engine coolant from the vehicle's radiator is the heated fluid used in the in-line heater.
Figure 9:
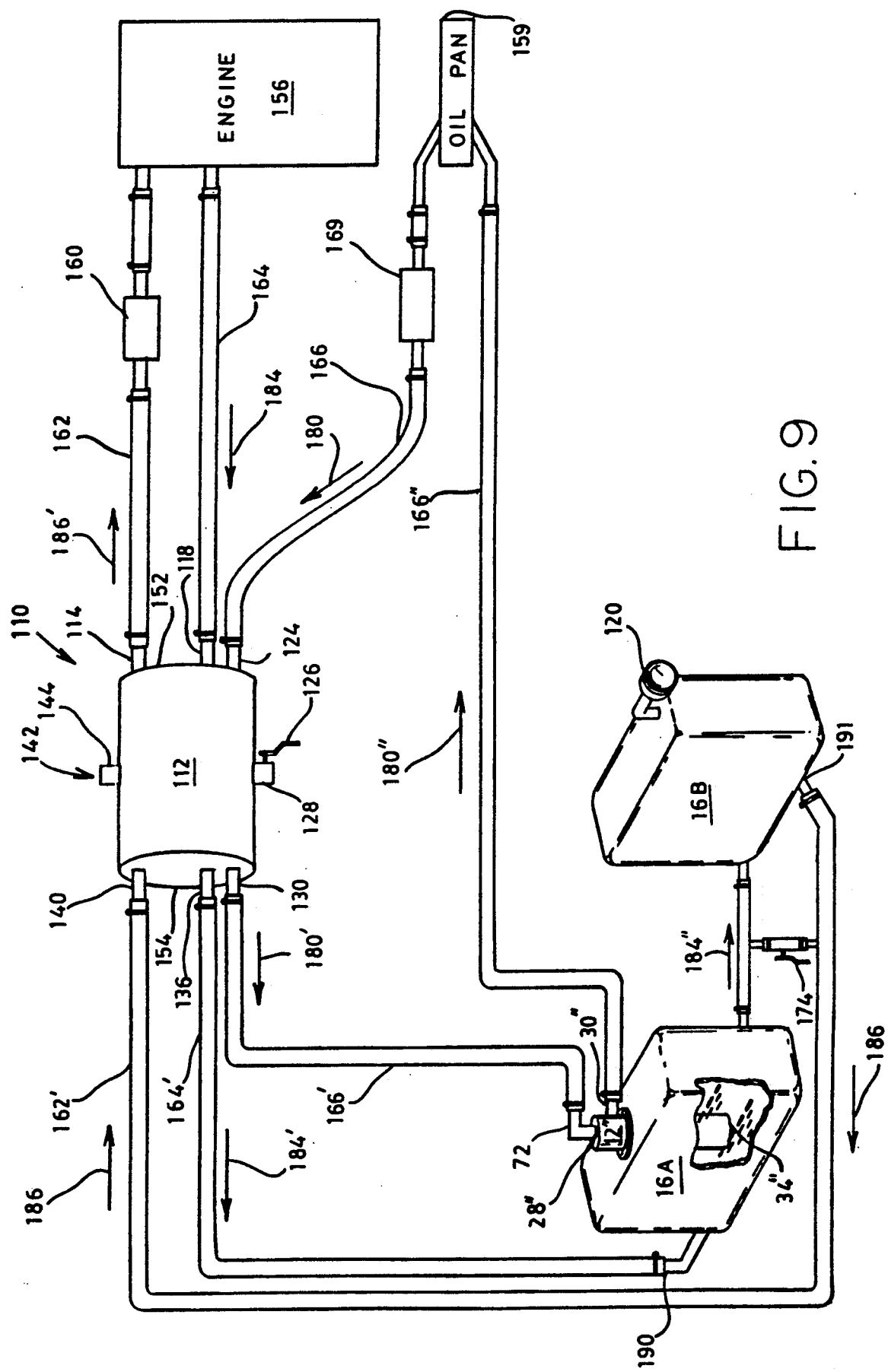
FIG. 9 is a pictorial illustration of a system diagram of one arrangement of the present invention, wherein oil from an oil pan of the engine is the heated fluid used in both the tank heater and the in-line heater.

Inlet port 118 conducts unused returned fuel 151 (illustrated in a cutaway view of the pipe 118-136) from the engine in the direction of arrow 184 through a continuous pipe (which has no fluid communication with the volume of heater 112) to outlet port 136, either for direct return to fuel tank 16A by port 190, as shown by arrow 184', FIG. 7 and 9, or to the in-tank heater 12, arrow 184' FIG. 8, for use as the heated fluid therein. In this context (FIG. 8), the heated returned fuel enters in-tank heater 12 at port 28 and exits through port 30, flowing through hose 164" in the direction of arrow 184" to fuel tank 16B at port 191.

Inlet port 124 at tank 112 conducts heated fluid 153 (also shown in a cutaway view of its pipe) in the direction of arrow 180 and through another continuous pipe having no fluid communication with the interior of container 112 to exit port 130 for return to its source, either directly, as indicated by arrow 180' in FIG. 8, or through tank heater 12" and then back, as shown by arrows 180' and 180" in FIGS. 7 and 9.

It will be appreciated by those skilled in the art that, in its passing from port 124 to port 130, heated fluid 153 will impart a substantial portion of its heat to the fuel 146 which fills the volume of container 112 and surrounds, not only the pipe extending from 124 to 130, but also the pipe from 118 to 136. Further, those skilled in the art will also realize that the internal pipes of tank 112, such as those extending from ports 118 to 136 and 124 to 130, for example, can be of a different diameter than that of the attaching hoses or lines. For instance, it may be desirable to have such pipes of a larger cross-sectional diameter in order to expose a larger amount of fuel to the heating process of tank 112, or to slow the passage of a given amount of fuel through the heating tank 112.

Figure 4A:
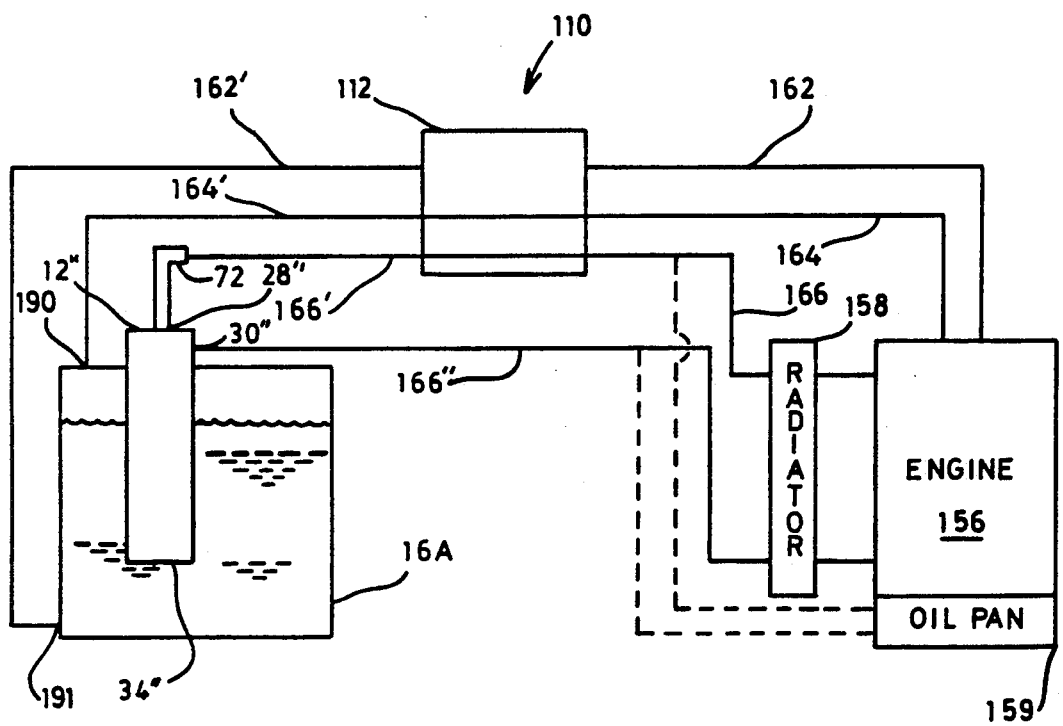
FIG. 4A illustrates a block diagram of a system, constructed in accordance with various features of the present invention, for preheating fuel, both in a fuel tank and in a fuel line, for an internal combustion engine.

One arrangement of a system 110, constructed in accordance with various features of the present invention, for preheating the fuel of an internal combustion engine both in-tank and in-line, is illustrated by the diagrams of FIGS. 4A, 7, and 9. FIG. 4A is a block diagram showing the version of the tank heater designated 12". The pictorial diagram of FIG. 7 illustrates the use of engine coolant from the radiator 158 of a vehicle's engine 156 as a heated fluid with the 12" version tank heater, while engine oil from a vehicle's engine oil pan 159 is illustrated as the heated fluid in FIG. 9.

Figure 4B:
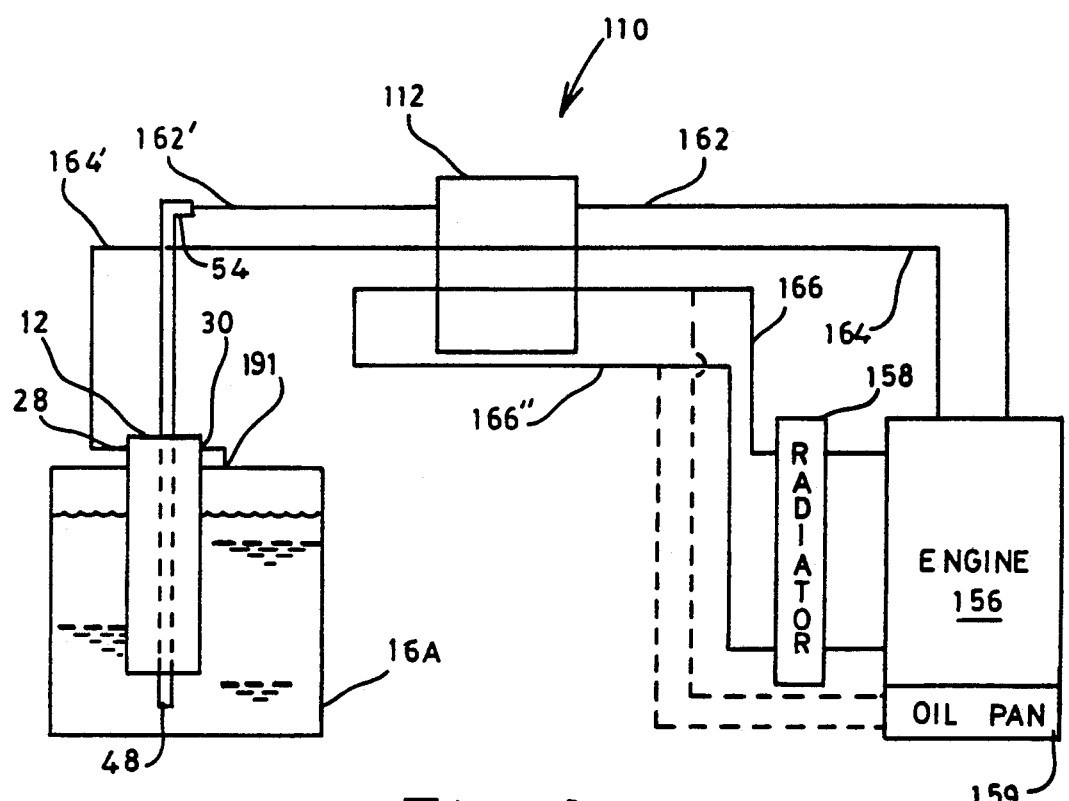
FIG. 4B illustrates an alternate arrangement of a system, constructed in accordance with various features of the present invention, for preheating fuel, both in a fuel tank and in a fuel line, for an internal combustion engine.

An alternate arrangement of a system 110, constructed in accordance with various features of the present invention, for preheating the fuel of an internal combustion engine both in-tank and in-line, is illustrated by the diagrams of FIGS. 4B and 8. FIG. 4B is a block diagram showing the version of the tank heater designated 12. The pictorial diagram of FIG. 8 illustrates the use of unused fuel returned from a vehicle's engine as a heated fluid with the 12 version tank heater, while either engine oil from a vehicle's engine oil pan 159, or engine coolant from a vehicle's radiator 158 is returned directly to that source.

At an initial installation of the system, as depicted in FIG. 7, the airtight container portion of heater 112 would be filled (primed) with diesel fuel 146 by way of priming port 144. When the engine 156 is started, fuel is drawn from the fuel tank 16B at 191 in the direction of arrow 186 into port 140 of heater 112 to replenish the fuel 146 moving out port 114 in the direction of arrow 186', through fuel line 162 and fuel pump 160, to the engine 156. After the initial startup, priming will no longer be necessary.

A fluid 153 heated by the action of the engine 156, is pumped through hose 166 in the direction of arrow 180 into inlet 124 of heater 112. As engine 156 runs, the heated fluid 153, whether coolant from the radiator 158, pumped by the water pump 170, or oil from the pan 159, pumped by the oil pump 169, is conducted by hose 166 in the direction of arrow 180 to inlet 124 of the heater 112, its temperature continually increasing until it reaches its maximum. As the heated fluid passes through the pipe 124–130, it transfers a substantial portion of its heat through the walls of the pipe containing it into the fuel 146 which surrounds the pipe in the container volume of in-line heater 112.

Unused fuel 151 will be returned from engine 156 through hose 164 in the direction of arrow 184 to inlet port 118 of heater 112. As this returned fuel 151 passes through heater 112 from 118 to 136, it is also heated by the heated fluid 153. However, as this returned fuel 151 already possesses some heat, it will not consume much energy from the heated fluid 153, thus adding to the overall heating of the fuel 146 in the container portion of heater 112.

From exit port 136, returned fuel 151 flows through hose 164' in the direction of arrow 184' to the fuel tank return inlet 190 at the base of fuel tank 16A in FIGS. 7 and 9. As this heated return fuel 151 mixes with the fuel in the tank, the temperature of the fuel stored therein is raised thereby, comprising still another stage of heating.

Crossover ball valve 174 is usually provided on most vehicles utilizing the present invention and is shown for illustration purposes only.

The system depicted in FIG. 8 is substantially identical to that shown in FIGS. 7 and 9, except that heated return fuel 151 instead of heated fluid 153 is used in the tank heater 12.

As shown in FIG. 8, heated fluid 153 returns directly to its source through hose 166' in the direction of arrow 180' from outlet 130 of in-line heater 112. Heated return fuel 151 is conducted by hose 164' in the direction of arrow 184' from outlet 136 of heater 112 to inlet port 28 of tank heater 12.

Heated fuel 151 then flows through tank heater 12, as previously described above and as best seen in FIG. 1, exiting at port 30. In passing through tank heater 12, heat from return fuel 151 is transferred to not only the fuel remaining in tank 16, but also to the fuel being drawn from tank 16B as that fuel flows from arrow 60A' to arrow 60A and through orifice 48 into the fuel tube 32 of tank heater 12. As return fuel 151 exits tank heater 12 at port 30, it travels through hose 164" in the direction of arrow 184", finally entering fuel tank 16B at 191. The now-somewhat-warmed fuel in tank 16B, traveling in the direction of arrows 60A' and 60A, and entering the fuel tube at orifice 48, passes upward therethrough, receiving more heating as it does so, exiting through port 54. From exit port 54, the warmed fuel flows through hose 162' in the direction of arrow 186, entering in-line heater 112 through inlet port 140 to receive more heating therein, after which it exits through outlet port 114 in the direction of arrow 186' on its way to the engine.

In substantially identical FIGS. 7 and 9, a heated fluid other than the returned fuel is used in the tank heating unit 12". FIG. 7 illustrates the use of engine coolant from a vehicle's radiator as a heated fluid, and FIG. 9 illustrates the use of engine oil from a vehicle's oil pan.

In FIG. 7, beginning with port 191 of fuel tank 16B, the flow path of fuel leaving the tank is in the direction of arrow 186 through hose 162' and into inlet port 140 of in-line heater 112. The fuel exits unit 112 at port 114, going to fuel pump 160 and the engine 156 through hose 162.

Unused fuel from engine 156 travels through hose 164 in the direction of arrow 184, entering unit 112 at port 118. Exiting 112 at port 136, the warmed return fuel travels along hose 164' in the direction of arrow 184', re-entering fuel tank 16A at port 190. The effect of more and more warmed return fuel being added to that in tank 16A is to aid in increasing that fuel's overall temperature. Arrow 184" illustrates the completion of the loop of fuel flow, travelling from tank 16A to 16B, normally, or through the crossover at valve 174.

A heated fluid is conducted through hose 166 in the direction of arrow 180 from an oil pump 169, FIG. 9, or a water pump 170, FIG. 7, to inlet port 124 of in-line heater 112.

Figure 10:
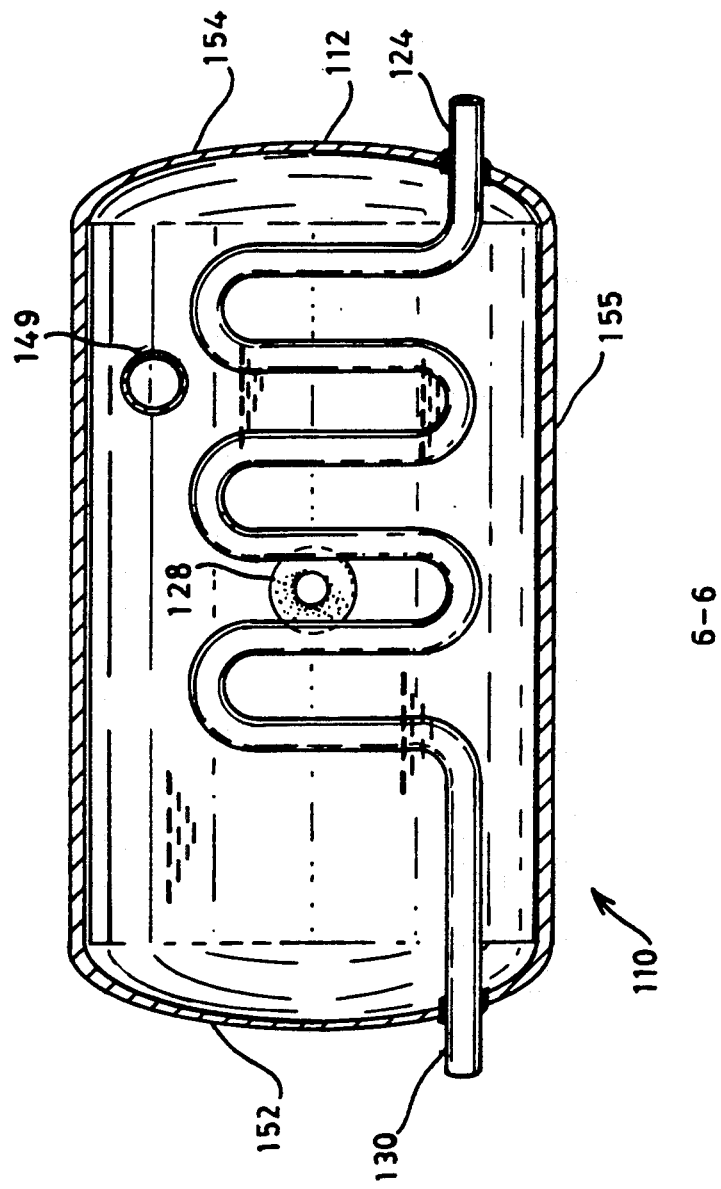
FIG. 10 is an illustration of a cutaway view of an in-line heater, taken at 6—6 of FIG. 6, showing one possible alternate configuration of the pipe conducting heated fluid through the in-line heater.

Although the connection from 124 to 130 has been described and illustrated as a pipe, it will be understood that this portion of the present invention can take any of several shapes, including, but not limited to, the accordion-like shape illustrated in FIG. 10, in order to impart optimum heated surface contact with the fuel. Internal baffles in pipe 124-130 can also be used.

Exiting unit 112 at port 130, the heated fluid is carried by hose 166' in the direction of arrow 180' into inlet port 28" of tank heating unit 12". As illustrated at 34" in the cutaway view of tank 16A and in FIG. 5, there is no fluid communication with the fuel in tank 16A. The heated fluid rises up around the central inlet tube (70, FIG. 5) and exits through port 30". From here, the fluid flows through hose 166" in the direction of arrow 180" back to its source, the radiator 158 in FIG. 7, or oil pan 159 in FIG. 9.

In this manner, the fuel circulating in the lines is kept from cooling substantially at any point in the system, maintaining its temperature throughout above the point at which gelling or "waxing" can occur.

Accordingly, when the system 110 is installed in a vehicle or other device powered by an internal combustion engine, the efficiency of such engine will be improved. In particular, the system 110 will eliminate or minimize the problem of congealing or "waxing" of diesel fuel in a diesel engine-powered vehicle or other device operated in cold weather environments.

In light of the foregoing, it can be seen that a system 110 is provided by the present invention for preheating the fuel for an internal combustion engine, both in the fuel tank 16A by a heat exchanger 12 installed through an access opening 14 in the fuel tank, and in-line by a supplemental fuel-containing heat exchanger 112. Heat exchanger 112, which is nearer the engine, transfers heat from a heated fluid to the fuel sumped therein. This warmed fuel ensures engine operation. The heated fluid then passes to the tank heater 12, where it is used to heat the fuel being stored in the vehicle's fuel tank. This fuel is further heated by the heated fluid as it is drawn through the fuel tube 32 into the fuel line 60 or 162'. Unused fuel being returned from the engine and added to that in the tank further contributes to the warming of the fuel in the vehicle's system. Thus, a self-contained, closed-loop system for using a vehicle's heat to pre-warm the fuel operating the engine providing the heat has been described. It will be seen that, at no point in the fuel system, will the temperature of the fuel be allowed to drop low enough to cause jelling or "waxing".

While preferred embodiments have been shown and described, it will be understood that it is not intended to limit the invention to such disclosure, but rather, the intention is to cover all modifications and alternate constructions falling within the scope of the invention as defined in the appended claims.

I claim:

1. A system for preheating fuel for an internal combustion engine having a fuel line, comprising:

a fuel tank for storing fuel to be supplied to said fuel line, said tank having an access opening provided in an upper portion thereof;

an elongated first heat exchanger installed through and secured to said access opening, a substantial portion of said first heat exchanger being contained within said fuel tank;

said first heat exchanger defining an inlet port and an outlet port proximate a first end portion of said first heat exchanger positioned externally of said fuel tank;

a heated fluid chamber defined by said first heat exchanger communicating between said inlet and outlet ports, said heated fluid chamber including a divider plate which separates said heated fluid chamber into an inlet section communicating with said inlet port and an outlet section communicating with said outlet port, said divider plate being positioned such that a heated fluid entering said inlet port flows toward a second end portion of said first heat exchanger where said heated fluid flows through said outlet section of said heated fluid chamber and exits through said outlet port;

a source of said heated fluid;

means for providing fluid communication between said source of heated fluid and said inlet and outlet ports of said first heat exchanger;

said first heat exchanger further comprising a fuel tube passing substantially axially through said heated fluid chamber and forming a portion of said divider plate, said fuel tube having a fuel inlet end positioned externally of said heated fluid chamber proximate said second end portion of said first heat exchanger in fluid communication with said fuel in said fuel tank, and said fuel tube having a fuel outlet end with ninety degree elbow positioned externally of said heated fluid chamber proximate said first end portion of said first heat exchanger in fluid communication with said fuel line of said internal combustion engine;

a second heat exchanger installed in series with said fuel line intermediate said fuel tank and said internal combustion engine;

a fuel storage means portion of said second heat exchanger for storing a quantity of said fuel;

a heat transfer means portion of said second heat exchanger for transferring heat from said heated fluid to said fuel stored in said storage means;

inlet and outlet means portions of said second heat exchanger for connecting to said second heat exchanger, to said fuel line, to said heated fluid source, and to a source for unused fuel returned from said engine;

attaching means for attaching said second heat exchanger to said vehicle;

whereby said fuel in said fuel tank is heated by heat transferred from said heated fluid contained within said heated fluid chamber through the walls of said first heat exchanger;

whereby fuel drawn from said fuel tank through said fuel tube into said fuel line is further heated by heat transferred from said heated fluid contained by said heated fluid chamber which surrounds said fuel tube in said first heat exchanger;

whereby fuel drawn from said fuel tank through said first heat exchanger is further heated in said second heat exchanger by heat transferred from said heated fluid through walls of a fluid-conveying pipe immersed in said fuel stored in said second heat exchanger storage means;

whereby said return fuel being returned from said engine is further heated while passing through said second heat exchanger; and whereby said fuel in said fuel tank receives heat in the process of being mixed with said heated return fuel being returned from said engine.

2. The system of claim 1 wherein said source of heated fluid comprises a radiator containing a coolant which communicates with a block of said internal combustion engine for cooling said engine.

3. The system of claim 1 wherein said source of heated fluid comprises an oil pan of said internal combustion engine.

4. A system for preheating fuel for an internal combustion engine of a vehicle having a fuel line, said vehicle being equipped with a fuel tank for storing fuel to be supplied to said fuel line, said fuel tank provided with an access opening in an upper portion thereof, which comprises:

an elongated shell member defining an exterior surface of a tank heat exchanger, said shell member installed through and secured to said access opening with a first substantial portion of said shell member disposed within said fuel tank and a second portion disposed exterior to said fuel tank, said shell member provided with an inlet port and an outlet port in said second portion exterior to said fuel tank, said shell member having a lengthwise axis;

a top closure for said second portion of said shell member exterior to said fuel tank;

a bottom closure for said first portion of said shell member;

a fuel tube mounted axially within said shell member, said fuel tube extending through and sealed to said top and bottom closures of said shell member, said fuel tube having an open first end proximate said bottom closure, said open first end having communication with said fuel tank, and an open second end formed into a bend of substantially ninety degrees from the body of said fuel tube proximate said top closure for connection with said fuel line;

a pair of oppositely disposed divider plates disposed axially within said shell member extending from said top closure to a distal end positioned near said bottom closure, said divider plates attached to and extending radially to said fuel tube and further attached to said top closure, said divider plates forming an inlet portion within said shell member communicating with said inlet port and an outlet portion within said shell member communicating with said outlet port, said inlet portion and said outlet portion joined at said distal end of said divider plates;

a source of heated fluid;

means for providing fluid communication between said source of heated fluid and said inlet and outlet ports of said shell member whereby said heated fluid flows into said shell member through said inlet port into said inlet portion, through said outlet portion and out through said outlet port to thereby transfer heat from said heated fluid to fuel in said fuel tank, and whereby said heated fluid flowing through said shell member transfers heat into fuel flowing through said fuel tube from said fuel tank to said fuel line;

an in-line heat exchanger for installation in said fuel supply line between said tank heat exchanger and said engine of said vehicle for additional heating of said fuel at a point intermediate said tank heat exchanger and said engine;

said in-line heat exchanger having:
a. containment means defining an interior volume for containing a reservoir of fuel to be heated, with a plurality of inlet ports, outlet ports, at least one capped fill spout, and at least one drain valve;
b. means for attaching one each of said plurality of inlet and outlet ports to said fuel supply line so that said fuel can be pumped into and out of said in-line heater;
c. means for attaching at least one each of said plurality of inlet and outlet ports to a return fuel line and conveying said fuel returning from said engine to said fuel tank through said in-line heater, said conveying means being immersed in said fuel contained within said interior volume without having fluid communication with said interior volume of said in-line heater;
d. means for attaching at least one each of said plurality of inlet and outlet ports to a source of heated fluid; and
e. a heated fluid pipe for conveying said heated fluid through said in-line heater, wherein said heated fluid pipe is immersed in said fuel contained within said interior volume of said in-line heater but has no fluid communication with the interior volume of said in-line heater, transferring heat to said fuel contained within said interior volume by conduction through the walls of said heated fluid pipe.

5. A system for preheating fuel for an internal combustion engine in a vehicle having said engine with a fuel tank and a fuel line, which comprises: an in-tank heat exchanging unit installed in said fuel tank for heating fuel in said fuel tank; and an in-line heat exchanging unit installed in said fuel line for further heating of said fuel intermediate said engine and said fuel tank, said in-line heat exchanging unit comprising:

reservoir means for receiving, storing, and providing an output of an amount of said fuel on demand from said engine;

a plurality of inlet and outlet ports for connecting said reservoir means to a source of said fuel, to a source of return fuel from said engine, and to a source of a heated fluid;

filler means for externally filling said reservoir with a quantity of said fuel;

external drain means for draining at least a portion of the contents of said reservoir means;

heat transferring means for transferring a portion of heat from said heated fluid to said fuel contained in said reservoir means of said in-line heat exchanger; and secondary heat transferring means for transferring a portion of heat from said heated fluid to said return fuel being returned from said engine, as said return fuel is passed through said in-line heat exchanger enroute to said fuel tank.

6. The system of claim 5 wherein said source of heated fluid comprises a radiator containing a coolant which communicates with a block of said internal combustion engine for cooling said engine.

7. The system of claim 5 wherein said source of heated fluid comprises an oil pan of said internal combustion engine.

8. The system of claim 5 wherein said heat transferring means comprises containment means for said heated fluid and said returned fuel which are of different cross-sectional diameter than supply hoses and lines connected thereto.

* * * * *